Sept. 17, 1957     A. S. KROTZ ET AL     2,806,748
FLUID SEALING STRUCTURE

Filed May 10, 1954     2 Sheets-Sheet 1

INVENTORS
ALVIN S. KROTZ
ROBERT H. HAYES
BY
ATTY

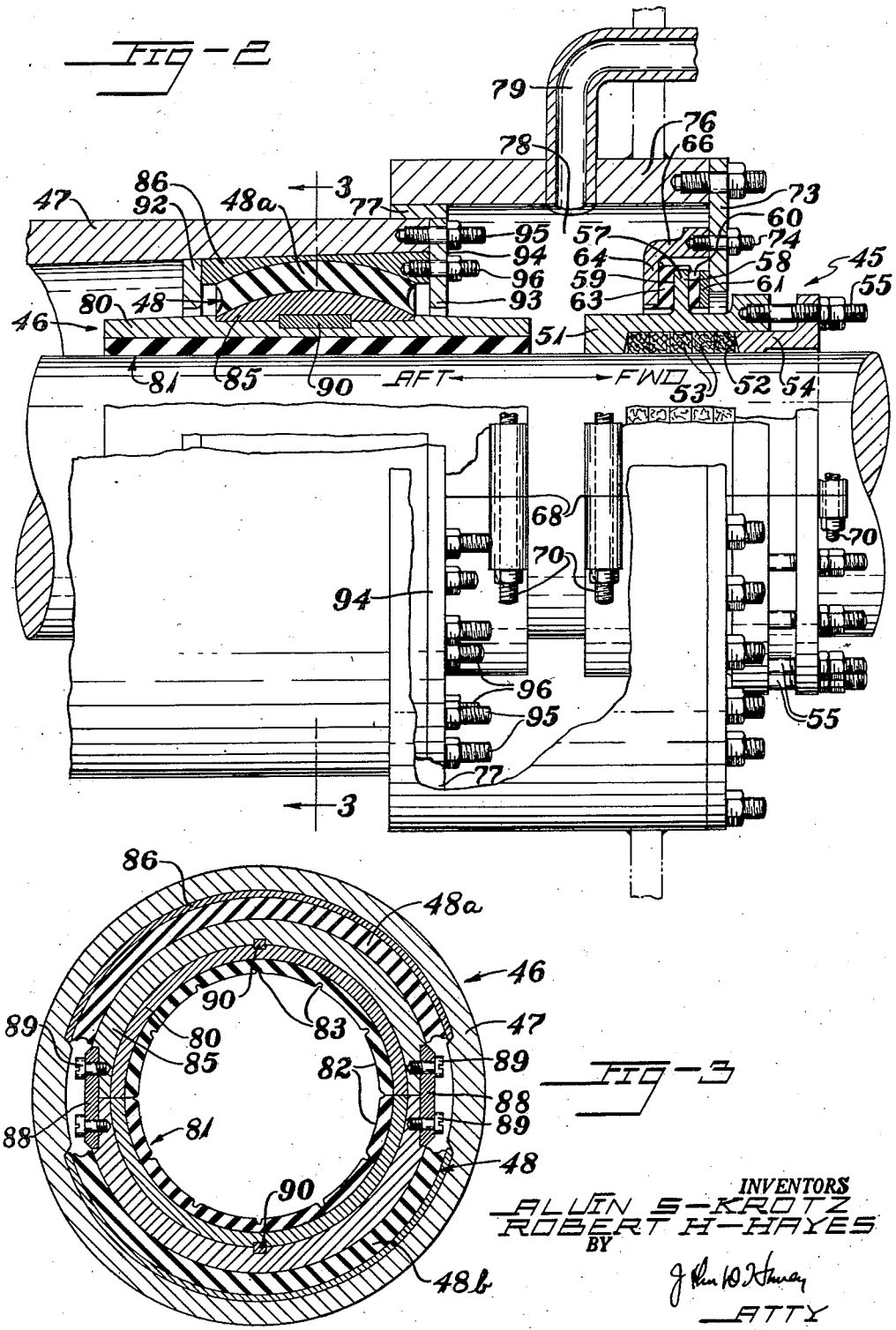

United States Patent Office

2,806,748
Patented Sept. 17, 1957

2,806,748
FLUID SEALING STRUCTURE

Alvin S. Krotz, Akron, and Robert H. Hayes, Columbia Station, Ohio, assignors to The B. F. Goodrich Company, New York, N. Y., a corporation of New York Application May 10, 1954, Serial No. 428,417

7 Claims. (Cl. 308—36.1)

This invention relates to a fluid sealing structure especially suitable for marine propeller shafting and the like, and the invention includes a resilient journal bearing assembly for marine shafting in which this improved sealing structure is embodied.

A stuffing box or an equivalent sealing device has been usually provided about a marine propeller shaft adjacent the point of communication of a stern tube with the interior of the hull to prevent leakage of water from the shaft bearings in the stern tube into the hull. Because of the complex patterns of deflection which occurs in a marine propeller shaft resulting from the loads to which it is subjected in service, it has been very difficult to maintain an effective seal about the shaft in this area. The packings or other sealing members engaged with the shaft tend to be worn rapidly by the movements of the shaft and the varying radial pressure exerted on them, and in many instances the metal members of the devices have been damaged to the extent that the complete sealing unit must be replaced.

In accordance with this invention a sealing structure is provided in which the sealing members engaged with the shaft are suspended from the stern tube or an adjacent hull structure by a body of resilient rubber-like material. The resilient rubber body is shaped and disposed about the sealing members so that it may be deformed essentially in shear when the sealing members are subjected to radial pressure of the shaft. Accordingly the sealing members are adapted to "float," i. e., they are displaceable radially by the movements of the shaft and thus the desired sealing engagement between the sealing members and the shaft remains substantially unaltered by such movements of the shaft. The rubber body also insulates the hull from the impact of shock loads of the shaft against the sealing members and cushions axial movements of the sealing members resulting from thrust loads imposed by the shaft. It further provides a seal exteriorly of the sealing members to prevent leakage of water into the hull in these portions. In one of the embodiments of the invention hereinafter disclosed the pressure of the bearing-lubricating water within the stern tube is utilized to regulate the degree to which the resilient rubber body permits radial displacement of the sealing members. This improved sealing structure may be engaged with the forward end of a stern tube journal bearing or to portions of the stern tube or hull adjacent the bearing. The structure is advantageously utilized in combination with the journal bearings of resilient rubber material since these bearings are inherently yieldable to accommodate deflection or other irregular motions of the shaft. The invention includes this sealing structure in combination with such bearings, and also in an assembly in which a rubber journal bearing is resiliently suspended by a body of rubber within the stern tube so that they may be tilted or otherwise moved universally to accommodate deflections of the shaft. In this latter assembly the shaft motion is practically unrestrained by the bearing and therefore the sealing members are displaceable exactly in correspondence with the type of deflection imposed on the bearing by the shaft.

The invention will be further described with reference to the accompanying drawings which illustrate preferred structures made in accordance with and embodying the principles of this invention.

In the drawings:

Fig. 2 is a side elevation partially in cross-section showing a bearing assembly in which a rubber journal portion is suspended within a stern tube for universal movement with the shaft and including another preferred type of sealing structure; and Fig. 3 is a cross-sectional view taken on the line 3—3 of Fig. 2 showing certain details of the bearing structure of Fig. 2.

Figure 1:
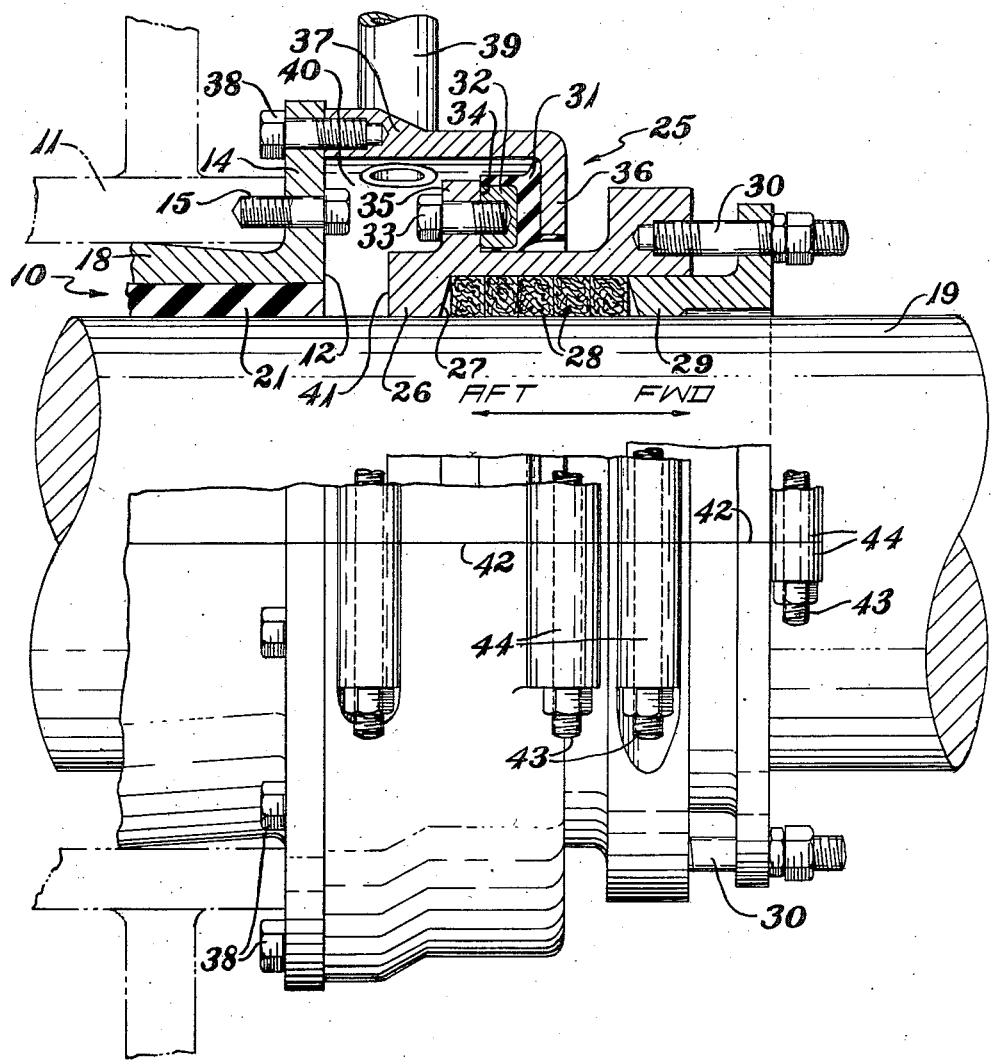
Fig. 1 is a side elevation partially in cross-section showing the forward end of a rubber journal bearing with resiliently supported sealing members engaged with the shaft adjacent the forward end of the bearing.

In the form of the invention shown in Fig. 1 a rubber journal bearing 10 is positioned in a rigid shaft housing such as a stern tube 11 with the forward end 12 of the bearing terminating in an outwardly directed flange 14 which is secured to the end of the stern tube by a series of bolts 15. The bearing 10 includes a rigid metal tubular shell 18 which fits inside the stern tube and through which a propeller shaft 19 extends. Within the bore of the shell 18 there is provided a journal layer 21 of resilient rubber material against which the shaft rotates. Preferably the rubber journal layer 21 is vulcanized to the bore of the sleeve 18 but may be secured to the shell in one of several different ways known in the art. Preferably the rubber journal layer 21 further includes a plurality of axial grooves (not shown in connection with Fig. 1 but note journal layer in Fig. 3) extending the length of the journal layer parallel to the rotational axis of the shaft to divide the layer into a plurality of lands (not shown) circumferentially spaced around the inner periphery of the layer. This arrangement of lands spaced by grooves is known in the art and is particularly exemplified by the type of rubber journal bearings made by The B. F. Goodrich Company known as "Cutless" bearings. The grooves are adapted to permit the circulation of water lengthwise through the bearing to provide a lubrication film between the shaft journal and the lands of the bearing.

The stern tube is normally flooded with sea water to provide the desired lubrication of bearings and to prevent this water from entering the hull a sealing structure 25 is provided about the shaft adjacent the forward end of the stern tube. This structure includes a stuffing box housing 26 which concentrically encircles the shaft 19 and has an interior channel 27 about the shaft to receive coils of packing 28 or other sealing means which may be pressed into sealing engagement with the shaft surface by a gland sealing ring 29 axially adjustable relative to the housing by the studs 30.

The housing 26 is supported so that it may float or yield laterally in response to radial pressure of the shaft against the packing by an annular circumferentially continuous rubber body 31 which encircles the exterior of the housing. The rubber body 31 is generally rectangular in cross-section and is positioned so that its greater cross-section dimension is disposed radially of the housing. One radial side of the rubber body is vulcanized to an annular metal ring 32 which extends concentrically around the housing and which is secured in laterally abutting relation by a series of bolts 33 to an annular radial face 34 of a radially outwardly projecting flange 35 formed about the exterior of the housing 26. The opposite radial side of the rubber body 31 is vulcanized to an inwardly directed radial flange 36 of an outer collar 37 which encircles the portion of the housing 26 directed toward the bearing 10 and which is secured to the outer margin of the flange 14 by a series of bolts 38. From this construction it is evident that the lateral displacement of the housing 26 by loads imposed by the shaft results in the elastic deformation of the rubber body 31 in radial shear. Further the rubber body 31 is adapted to cushion axial movement of the housing which may result from thrust type movements of the shaft. The housing 26 may also be tilted relative to the outer collar 37 by motions of the shaft although normally such movement, if any, will be relatively slight. It may be seen in Fig. 1 that the rubber body 31 is located substantially medially of the packing 28 so that the displacement of the ends of the housing as a result of tilting will be equalized and minimized.

It is generally desirable to increase the circulation of lubrication water through a stern tube bearing either by pumping water into the forward end of the bearing or by pumping water from the forward end of the bearing. In this installation of Fig. 1 either of these results may be accomplished by a conduit 39 connected to the collar 37 so that it communicates with a chamber 40 inside the collar 37 defined by the flange 14, the rubber body 31 and the portions of the housing 26 embraced by the collar 37. The conduit 39 may be connected to the suction side of a suitable pump (not shown) to withdraw water from this chamber, or water may be pumped into this chamber through the conduit so that it may flow rearwardly through the grooves of the bearing. Under either of these circumstances the pressure of the water inside this chamber 40 acts on an exposed end face 41 and on the flange 35 of the housing and tends to urge the housing 26 forwardly along the shaft to compress the rubber body 31. The rubber is maintained under substantial compression during the operation of the shaft so that the stresses on the vulcanized bond of the radial faces of the rubber are relieved and the fatigue life of the rubber is appreciably improved. Further, the imposition of a direct tensile load on the rubber body 31 is avoided which tends to preserve the strength of the bonds joining the rubber body 31 to the ring 32 and flange 36. The junction formed by the bolts 38 between the outer collar 37 and the flange 14; the connection between the annular ring 32 and the flange 35 by the bolts 33; and the vulcanized bonds which secure the rubber body 31 to the ring 32 and to the flange 35 all provide a fluid-tight seal in these respective areas.

The bearing 10 is advantageously formed in semi-cyclindrical sections or assembled together to surround the shaft. Similarly, the housing 26, the sealing gland 29 and the outer collar 37 are preferably each formed in semi-cylindrical sections which fit together on diametrically opposite sides of the shaft along the mating faces 42 and are secured together by suitable pinch bolts 43 through bosses 44 on these members. The rubber body 31 and the annular ring 32 to which it is secured are each semi-annular and the respective portions of these elements mate together in the assembly of the collar and housing. The use of the ring 32 is particularly convenient for the manufacture of these parts although the rubber body may be vulcanized directly to the flange 35. In installing this structure preferably the housing 26 and gland ring 29 together with the packing 28 is first assembled around the shaft and the packing tightened in pressure engagement with the shaft to the desired extent by adjusting the gland 29. Thereafter, the collar sections 37 with their respective portions of the ring 32 and the rubber body 31 are assembled about the housing and the bolts 33 threaded into the ring 32 to secure the ring to the radial face 34 of the flange 35 of the housing. Thereafter, the outer collar 37 is secured to the flange 14 by the bolts 38.

In the embodiment of the invention illustrated in Figs. 2 and 3 a propeller shaft is supported by an assembly which includes a resilient sealing structure 45 and a resilient rubber journal bearing 46 which is suspended within a stern tube 47 by a rubber body 48. The bearing 46 together with its supporting body of rubber 48 is of the type described and claimed in the copending application of Robert H. Hayes, Serial No. 423,087, filed April 14, 1954, now Patent No. 2,793,087, and is adapted to tilt relative to the stern tube or undergo other forms of displacement such as torsion or axial movement in response to various movements or deflections occurring in the shaft. In this type of bearing, the shaft movements are essentially unrestrained by the bearings and consequently the sealing members of the sealing structure are subjected to displacements generally corresponding to those of the bearing.

The sealing structure 45 includes a stuffing box housing 51 with an internal cavity 52 to receive coils of packing 53 and a gland-sealing ring 54 which is adjustable axially of the housing by means of studs 55 to urge the packing into pressure engagment with the shaft. The packing may include a conventional internal fluid seal and internal lubrication devices (neither shown) to aid its sealing function.

To support the housing 51, a narrow annular flange 57 is formed integrally with and extends radially outward from the housing 51 and has a forward annular face 58 and an after annular face 59, each generally normal or perpendicular to the rotational axis of the shaft 44. The forward annular face 58 has vulcanized to it in laterally abutting relation one side of an annular resilient rubber body 60 which is rectangular in cross-section with its longer cross-sectional dimension directed radially of the housing. The opposite side of the rubber body 60 is vulcanized to a relatively thin annular ring 61 which has its radial dimension substantially coextensive with the face of the rubber ring 60 which it abuts. The after face 59 of the flange 57 has vulcanized to it one side of an annular resilient rubber body 63 of rectangular cross-sectional shape and substantially equal in size to the rubber body 60 and is positioned like the rubber body 60 with its longer dimension disposed radially of the housing. The opposite side of the body 63 is vulcanized to a radially inwardly directed flange 64 of an outer annular collar 66, which concentrically surrounds the housing 51.

The housing 51, the rubber bodies 60 and 63, the collar 66, and the ring 61 are manufactured as an integral unit. In this unit the radial flange 57, the radial flange 64 of the outer collar, and the annular ring 61 are mutually parallel and have the rubber bodies 60 and 63 interposed between these members of substantial equal thickness. Preferably, each of these elements is divided axially into generally semi-annular sections which fit together on opposite sides of the shaft along mating faces 68 when the elements are assembled with the shaft and these elements are connected together by pinch bolts 70 on the housing 51 and on the sealing gland 54. The sections of the collar are connected rigidly together in mating relation by securing the collar sections to a common annular support member 73 by a series of studs 74 which are in threaded engagement with the peripheral portion of the collar.

To install the stuffing box structure the sections of the housing 51, the gland 54, and collar 66 are assembled around the shaft as above described and then the collar sections are secured to the support member 73. Thereafter the plate 73 is fastened near its outer periphery to portions of the hull structure which include a generally cylindrical casing 76 which encircles the forward end of the stern tube and the after portion of the housing 51. The cylindrical casing 76 is welded by a connecting ring 77 to the forward end of the stern tube 47 to define an interior chamber 78 between the bearing and the housing 51. Lubricating water may be pumped into or out of this chamber through a conduit 79 for the purpose explained in connection with the corresponding structure in Fig. 1.

Details of the bearing structure are brought out in Fig. 3. The bearing includes a rigid metal inner shell 80 having a layer of resilient journal rubber 81 on the bore thereof formed with circumferentially spaced lands 82 intermediate axially-extending grooves 83 which circulate lubricating water through the bearing to provide a lubrication film between the shaft journal and the lands. The rubber body 48 about the exterior of the shell 80 is circumferentially divided into two arcuate sections 48a and 48b, each of which is interposed between and vulcanized to opposed concentric spherical surfaces formed on an inner collar 85 and an outer collar 86. The inner collar 85 encircles the shell 80 and is formed into semi-annular sections corresponding to the sections of the generally cylindrical sections of the shell 80. The ends of the inner collar sections are connected together at the mating faces of the shell sections by strap members 88 and screws 89 and are locked against rotation about the shell 80 by keys 90. The sections of the rubber body 48 extend through less than 180° of arc about their respective collar sections and are of uniform thickness. The outer collar 86 is also divided circumferentially into a pair of sections coextensive in their circumferential extent with the body sections 48a and 48b so that the ends of the outer collar sections and the rubber sections are spaced apart to provide access to the straps 88 and the bolts 89. The outer collar is preferably tapered somewhat to fit a corresponding taper in the bore of the stern tube and upon insertion of the outer collar in the stern tube, the sections of the outer collar are urged radially toward the inner collar to radially compress the rubber body 48. The after end of the outer collar abuts an inwardly-directed ring 92 located in the stern tube to position the outer collar. The forward end of the outer collar is secured in the stern tube by an annular inwardly-extending flange 93 of a ring 94 which is secured to the end of the stern tube by the studs 95 and which is additionally secured to the collar by the bolts 96 to prevent rotation of the outer collar within the stern tube.

In this embodiment of the invention the displacement characteristics of the housing 51 are principally regulated by the degree to which the rubber bodies 60 and 63 may be laterally compressed during assembly of the structure by tightening the studs 74 which fasten the collar 66 to the support plate 73. When the sealing structure is formed the rubber bodies 60 and 63 are preferably axially thicker than their axial thickness when the assembly is completed so that they may be compressed substantially when the studs 74 are tightened to bring the collar 66 into abutting relation with the plate 73. The collar 66 and the thickness of the bodies 60 and 63 may be designed to provide the desired displacement characteristics and these will not be affected appreciably by the pressure of the water in the chamber 78. It may be noted that the collar 66 fits within the chamber 78 so that only a relatively small area of the housing 51 is exposed to the pressure of the water within this chamber. Due to the shape and disposition of the rubber bodies 60 and 63, they offer a strong resistance to further compression and since the area of the housing exposed to the pressure of the liquid is small, the force tending to shift the housing axially is much less than in the embodiment shown in Fig. 1 and does not usually appreciably vary the displacement characteristics determined by the size of the bodies 60 and 63 and the collar 66.

The sealing structure advantageously cushions axial movements of the housing which will tend to further compress one of the rubber bodies and relieve the compression somewhat in the opposing body. In any event, the degree of compression is such that compressive loads are maintained at all times on the rubber bodies 60 and 63 so that the water pressure within the chamber 78 cannot weaken the bonds of the rubber against the respective flanges.

When the collar 66 is tightened against the plate 73, the annular ring 61 is pressed against the inner face of the mounting plate 73 and is adapted to slide radially against plate 73 when the housing is radially displaced. Therefore, although two rubber bodies 60 and 63 are employed in this installation, the shearing resistance of only the body 63 is utilized to oppose the displacement of the housing. Substantially little shearing stress is usually imposed on the rubber body 60 and the housing is more easily displaced radially by loads imposed by the shaft. In order to stiffen the resilient support for the housing 51, the ring 61 may be secured to the mounting plate 73 by means of screws or the like (not shown), in which case both rubber bodies will be subjected to radial shear upon displacement of the housing. In either type installation it is more convenient to manufacture the equipment with the annular ring 61 incorporated into the structure.

Variations of the structure disclosed may be made within in the scope of the appended claims.

We claim:

1. A bearing assembly for marine propeller shafting and the like comprising a rigid shaft housing, a shaft extending axially through the housing, a rubber bearing interposed between the shaft and said housing to journal the shaft in said housing, a fluid-sealing element embracing said shaft within said housing forwardly of the bearing, the element including an outwardly extending annular flange, a member integral with said housing radially overlapping and spaced axially from the side of said flange directed forwardly from the bearing, an annular circumferentially-continuous body of resilient rubber interposed between said flange and said member for connecting said fluid-sealing element to said housing, said body being elastically deformable in shear in a direction radial of the shaft upon displacement of the fluid-sealing element toward said housing by said shaft, and the portion of said housing between said bearing and said fluid-sealing element defining a chamber for lubricating fluid for said bearing, the pressure of the fluid acting against the fluid-sealing element to compress said rubber body.

2. A bearing assembly for marine propeller shafting and the like comprising a rigid shaft housing, a shaft extending axially through the housing, a rubber bearing interposed between the shaft and said housing to journal the shaft in said housing, a fluid-sealing element embracing said shaft within said housing forwardly of the bearing, the element including an outwardly-extending annular flange, a member integral with said housing radially overlapping and spaced axially from the side of said flange directed forwardly from the bearing, said member and said flange having opposed faces and an annular circumferentially continuous body of resilient rubber interposed between said faces for connecting said fluid-sealing element to said housing, said body having one side thereof vulcanized to one of said faces and having an annular ring vulcanized to the opposite side of the body, the ring being removably connected to the other of said faces whereby the rubber body is elastically deformable in shear in a direction radial of the shaft upon displacement of the fluid-sealing element toward said housing by said shaft, and the portion of said housing between said bearing and said fluid-sealing element defining a chamber for lubricating fluid for said bearing, the pressure of the fluid acting against the fluid-sealing element to compress said rubber body.

3. A bearing assembly for marine propeller shafting and the like comprising a rigid shaft housing, a shaft extending axially through the housing, a rubber bearing interposed between the shaft and said housing to journal the shaft in said housing, a fluid-sealing element embracing said shaft within said housing forwardly of the bearing, the element including a radially extending annular flange, having an annular radial face on each side thereof, a pair of members projecting radially inwardly from said shaft housing, one of said members radially overlapping the face of said flange directed aft toward the bearing and the other of said members radially overlapping the face of said flange directed forwardly from the bearing, and each of said members being spaced axially from the face of the flange to which it is adjacent, and interposed between each said member and its adjacent flange face a body of resilient rubber material maintained under compression and connecting said fluid-sealing element to said housing and being elastically deformable in shear in a direction radial of the shaft upon displacement of the fluid-sealing element, and the portion of said housing between said bearing and said fluid-sealing element defining a chamber for lubricating fluid for said bearing, the pressure of the fluid acting against the fluid-sealing element to vary the compression in said rubber bodies of the sealing element.

4. A bearing assembly for marine propeller shafting and the like comprising a rigid shaft housing, a shaft extending axially through the housing, a bearing within said housing embracing said shaft, the bearing comprising a rubber bearing layer, a rigid shell supporting said layer, a support member for said shell radially spaced from said shell and secured within said housing, and a body of resilient rubber-like material interposed between said shell and said support member for universally supporting said shell to accommodate displacement of the shell resulting from movement of the shaft, a fluid-sealing element embracing said shaft within said housing forwardly of the bearing, the element including a radially outwardly extending annular flange having an annular radial face on each side thereof, a pair of members projecting radially inwardly from said housing, one of said members radially overlapping the face of said flange directed aft toward the bearing and the other of said members radially overlapping the face of said flange directed forwardly from the bearing and each of said members being spaced axially from the face of the flange to which it is adjacent, and interposed between each said member and its adjacent flange face a body of resilient rubber material maintained under compression and connecting said fluid-sealing element to said housing and being elastically deformable in shear in a direction radial of the shaft upon displacement of the fluid-sealing element, and the portion of said housing between said bearing and said fluid-sealing element defining a chamber for lubricating fluid for said bearing, the pressure of the fluid acting against the fluid-sealing element to vary the compression in said rubber bodies of the sealing element.

5. A bearing assembly for marine propeller shafting and the like comprising a rigid shaft housing, a shaft extending axially through the housing, a rubber bearing interposed between the shaft and said housing to journal the shaft in said housing, a fluid-sealing element embracing said shaft within said housing forwardly of the bearing, the element including a radially extending annular flange, having an annular radial face on each side thereof, a pair of members projecting radially inwardly from said shaft housing, the first of said members radially overlapping the face of said flange directed aft toward the bearing and the second of said members radially overlapping the face of said flange directed forwardly from the bearing, and each of said members having an annular face spaced axially from and directed toward the face of said flange to which each said member is adjacent, a first body of resilient rubber material interposed between and adhered to said first member and said flange, a second body of resilient rubber material interposed between the opposing faces of said flange and said second member, said second body of rubber being adhered to one of the latter said faces and having on the opposite side an annular rigid ring engaged with the other of the latter said faces, each of said bodies of rubber being maintained under substantial compression and connecting said fluid-sealing element to said housing, the first rubber body being elastically deformable in shear in a direction radial of the shaft upon displacement of the fluid-sealing element and the second rubber body being deformable in shear to a lesser extent with said ring in slidable contact against the face which it abuts, and the portion of said housing between said bearing and said fluid-sealing element defining a chamber for lubricating fluid for said bearing, the pressure of the fluid acting against the fluid-sealing element to vary the compression in said rubber bodies of the sealing element.

6. A bearing assembly for marine propeller shafting and the like comprising a rigid shaft housing, a shaft extending axially through the housing, a bearing within said housing embracing said shaft, the bearing comprising a rubber bearing layer, a rigid shell supporting said layer, a suport member for said shell radially spaced from said shell and secured within said housing, and a body of resilient rubber-like material interposed between said shell and said support member for universally supporting said shell to accommodate displacement of the shell resulting from movement of the shaft, a fluid-sealing element embracing said shaft within said housing forwardly of the bearing, the element including a radially outwardly extending annular flange having an annular radial face on each side thereof, a pair of members projecting radially inwardly from said housing, the first of said members radially overlapping the face of said flange directed aft toward the bearing and the second of said members radially overlapping the face of said flange directed forwardly from the bearing, and each of said members having an annular face spaced axially from and directed toward the face of said flange to which each said member is adjacent, a first body of resilient rubber material interposed between and adhered to said first member and said flange, a second body of resilient rubber material interposed between the opposing faces of said flange and said second member, said second body of rubber being adhered to one of the latter said faces and having on the opposite side an annular rigid ring engaged with the other of the latter said faces, each of said bodies of rubber being maintained under substantial compression and connecting said fluid-sealing element to said housing, the first rubber body being elastically deformable in shear in a direction radial of the shaft upon displacement of the fluid-sealing element and the second rubber body being deformable in shear to a lesser extent with said ring in slidable contact against the face which is abuts, and the portion of said housing between said bearing and said fluid-sealing element defining a chamber for lubricating fluid for said bearing, the pressure of the fluid acting against the fluid-sealing element to vary the compression in said rubber bodies of the sealing element.

7. A fluid-sealing element for a marine propeller shaft and the like comprising a packing housing surrounding the shaft, sealing means within the packing housing engaging the shaft, an annular flange extending radially outward from the packing housing substantially medially of the ends of the housing, the flange having opposing annular faces on opposite sides thereof, a collar concentrically surrounding said flange in radially spaced relation thereto and having an annular face disposed parallel to and in radial overlapping axially spaced relation to one of said faces of said flange, an annular circumferentially-continuous body of rubber disposed between said overlapping faces and secured to said one face of the flange and to said face of said collar, a support member spaced concentrically from the housing to which said collar is connected, the support member having an annular face spaced axially from and overlapping the other of said faces of said housing flange in opposing parallel relation, and an annular body of rubber disposed between and secured to one of the latter said overlapping faces and having an annular rigid facing ring engaging the other of the latter said faces, each of said annular rubber bodies being compressed axially by said collar and said support member and both said annular rubber bodies terminating substantially at the periphery of said housing flange to provide for unobstructed radial displacement of said housing flange into the region between the periphery of the housing flange and said collar and elastic deformation of said rubber bodies essentially in shear.

References Cited in the file of this patent

UNITED STATES PATENTS

| | | |
|---|---|---|
| 1,569,370 | Hill | Jan. 12, 1926 |
| 2,166,822 | Parker | July 18, 1939 |
| 2,306,664 | Scott-Paine | Dec. 29, 1942 |
| 2,367,697 | Stitz et al. | Jan. 23, 1945 |
| 2,457,472 | Hufferd et al. | Dec. 28, 1948 |
| 2,673,103 | Tremolada | Mar. 23, 1954 |

FOREIGN PATENTS

| | | |
|---|---|---|
| 290,008 | Italy | Nov. 5, 1931 |